(12) United States Patent
Mauffrey

(10) Patent No.: US 6,230,611 B1
(45) Date of Patent: May 15, 2001

(54) ELECTRIC TOASTER FITTED WITH AN ELECTROMAGNET-AND-SWITCH UNIT

(75) Inventor: Guy Mauffrey, Breuchotte (FR)

(73) Assignee: SEB S.A. (FR)

( * ) Notice: Subject to any disclaimer, the term of this patent is extended or adjusted under 35 U.S.C. 154(b) by 0 days.

(21) Appl. No.: 09/672,207

(22) Filed: Sep. 28, 2000

(30) Foreign Application Priority Data

Oct. 4, 1999 (WO) .................................. PCT/FR99/02365

(51) Int. Cl.⁷ ................................ A47J 37/08; H05B 1/02
(52) U.S. Cl. ...................... 99/327; 99/329 P; 99/329 RT; 99/337; 99/385; 99/389; 219/521
(58) Field of Search .......................... 99/326–333, 385, 99/389–391, 393, 337, 396, 338, 400–402; 219/492, 494, 493, 506, 505, 411, 413, 481, 497, 489, 491, 521, 525, 518, 519

(56) References Cited

U.S. PATENT DOCUMENTS

| | | | |
|---|---|---|---|
| 3,869,970 | 3/1975 | Eagle | 99/329 R |
| 4,972,768 | * 11/1990 | Basora San Juan | 99/391 |
| 5,121,678 | * 6/1992 | Del Fresno | 99/393 X |
| 5,181,455 | * 1/1993 | Masel et al. | 99/401 X |
| 5,304,781 | 4/1994 | McNair et al. | 219/518 |
| 5,423,246 | * 6/1995 | McNair et al. | 99/334 |
| 5,487,328 | * 1/1996 | Fujii | 99/390 |
| 5,642,657 | * 7/1997 | Yeung et al. | 99/334 |
| 5,664,481 | * 9/1997 | Huggler | 99/328 |
| 5,771,780 | * 6/1998 | Basora et al. | 99/327 |
| 5,918,532 | 7/1999 | Arnedo et al. | 99/327 |

FOREIGN PATENT DOCUMENTS 37 31 959 C1    8/1988  (DE) .

* cited by examiner

Primary Examiner—Timothy F. Simone
(74) Attorney, Agent, or Firm—Lerner, David, Littenberg, Krumholz & Mentlik, LLP

(57) ABSTRACT

A toaster is disclosed including a main frame with a toasting compartment including an electrical resistance heater, a carriage mounted for reciprocation within the toasting compartment so that the bread product to be toasted can be loaded when the carriage is in an upper position and the bread product can be toasted when the carriage is in the lower position, an electromagnet for holding the carriage in the lower position, and a safety assembly for interrupting the supply of electricity to the electrical resistance heater at the end of a toasting cycle independent of the position of the carriage with the subassembly and including a lock to lock the carriage in the lower position, an armature for carrying the lock mounted adjacent to the electromagnet, and a resilient contact to establish electrical contact with the electrical resistance heater when the assembly is in the active position.

11 Claims, 5 Drawing Sheets

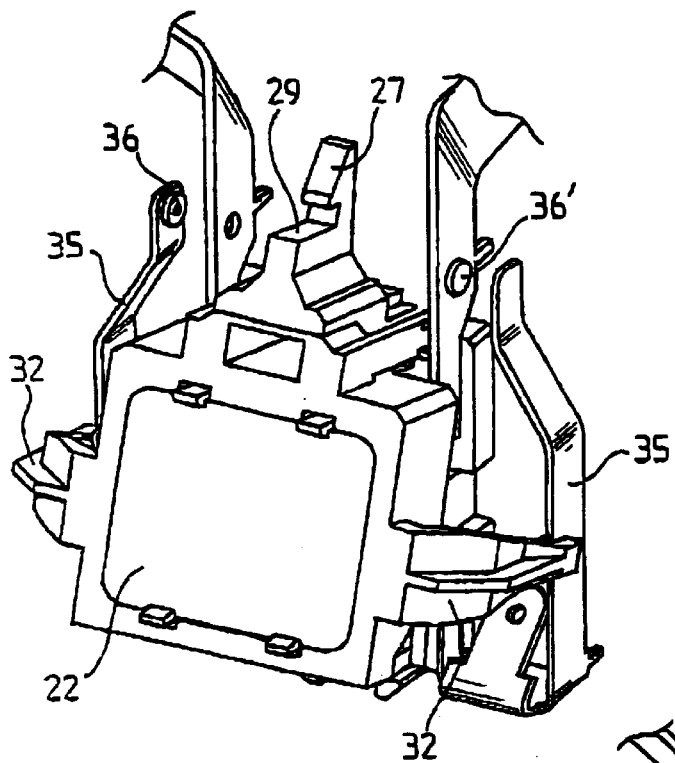
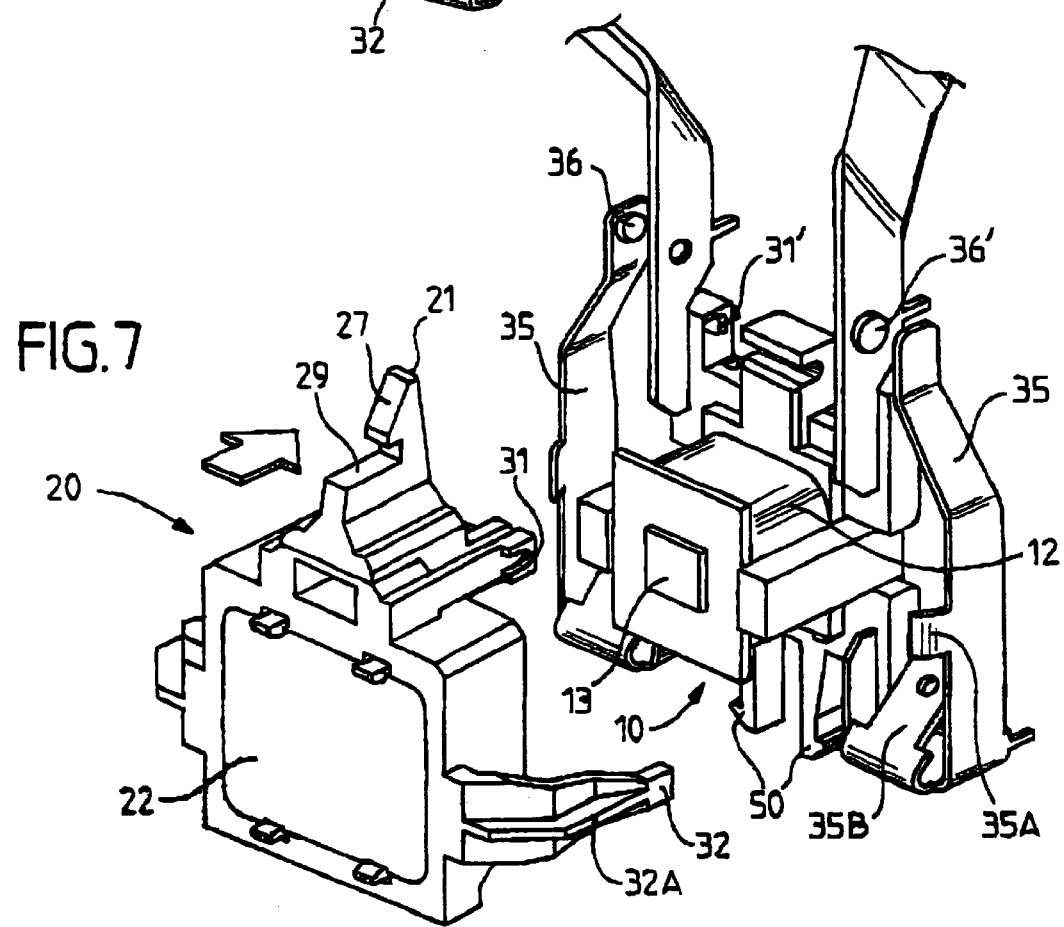

ELECTRIC TOASTER FITTED WITH AN ELECTROMAGNET-AND-SWITCH UNIT

FIELD OF THE INVENTION

The present invention relates to the general field of electric toasters for domestic use in toasting bread-based foods.

More particularly, the present invention relates to an electric toaster comprising a main frame including:

- a toasting compartment associated with one or more electrical resistances;
- a bread-carrier carriage mounted to move in the toasting compartment between a high position for bread insertion, and a low position for toasting bread enabling the power circuit for the electrical resistance(s) to be closed, the carriage being held in this position by interaction with an electromagnet; and
- electrical safety means for interrupting the electrical power supply to the electrical resistance(s) at the end of the toasting cycle independently of the position of the bread-carrier carriage.

It is known to make an electric toaster with a bread-carrier carriage that is mounted to move in the toasting compartment of the appliance so that when the bread-carrier carriage is in its low, toasting position, it is capable of engaging electrical contact blades either directly or indirectly for the purpose of closing the circuit that powers the electrical resistances of the appliance. In this position, the electromagnet which is usually located at the bottom of the toasting compartment is activated and holds the bread-carrier carriage in its toasting position by means of an armature. Such systems are in widespread use and are generally satisfactory. However, they suffer from a drawback associated with the possibility of the bread-carrier carriage becoming jammed in its low, toasting position, for example because a bread-based article has been inserted that is of dimensions that are much too large compared with the insertion slot of the toaster. In such a situation, at the end of the toasting period, the electromagnet is indeed deactivated, but since the bread-carrier carriage remains blocked and cannot rise, the electrical contacts remain closed so that the electrical resistances continue to be powered. This runs the risk of the bread-based article burning up completely which, after a while, can lead to greater damage.

That is why electrical safety devices have already been envisaged for interrupting the electrical power supply to the electrical toasting resistances at the end of the toasting cycle independently of the position of the bread-carrier carriage, i.e. even when the bread-carrier carriage is jammed in its low, toasting position.

Toasters are thus known which use a piece that is movably mounted on the bread-carrier carriage itself, with such a piece serving as an interface with the electromagnet and enabling the power supply circuit to the electrical resistances to be opened at the end of the toasting cycle by releasing that piece. The interface piece is mounted to move under drive from a spring, and it enables the electrical resistance circuit to be opened even when the bread-carrier carriage remains jammed in the toasting position. Such a system is generally satisfactory, but it does suffer from various drawbacks associated with manufacture and with the displacement accuracy required for the piece in order for it to open the electrical contacts.

Consequently, one of the objects of the invention is to seek to remedy the drawbacks of devices known in the prior art, and to propose a novel electric toaster provided with electric safety means that are particularly simple and low cost to manufacture and assemble, while also being particularly reliable.

Another object of the present invention is to propose a novel electric toaster in which the safety means are particularly reliable, and to make it possible in particular to avoid any possibility of the safety means locking or malfunctioning.

Another object of the present invention is to propose a novel electric toaster in which the safety means are particularly simple to assemble.

Another object of the present invention is to propose a novel electric toaster fitted with safety means that maintain their electrical connection/disconnection properties well over time.

SUMMARY OF THE INVENTION

In accordance with the present invention, these and other objects have now been realized by the invention of a toaster comprising a main frame including a toasting compartment including at least one electrical resistance member, a carriage mounted for reciprocation within the toasting compartment between an upper position and a lower position, whereby a product to be toasted can be loaded therein when the carriage is in the upper position and the product can be toasted when the carriage is in the lower position, an electromagnet disposed adjacent to the carriage when the carriage is in the lower position for holding the carriage in the lower position, safety means for interrupting the supply of electricity to the at least one electrical resistance member at the end of a predetermined toasting cycle independent of the position of the carriage, the safety means comprising an assembly independent of the carriage, the assembly movable between an active position and an inactive position, and comprising a lock for locking the carriage in the lower position when the assembly is in the active position and for releasing the carriage from the lower position when the assembly is in the active position, an armature for carrying the lock, the armature mounted adjacent to the electromagnet for engagement with the electromagnet when the assembly is in the active position and for disengagement from the electromagnet when the assembly is in the inactive position, and at least one resilient contact member for establishing electrical contact with the at least one electrical resistance member when the assembly is in the active position and for eliminating the electrical contact with the at least one electrical resistance member when the assembly is in the inactive position. In a preferred embodiment, the assembly includes a protective plate for covering the electromagnet when said assembly is in the active position.

In accordance with one embodiment of the toaster of the present invention, the assembly is mounted at a location with respect to the electromagnet.

In accordance with another embodiment of the toaster of the present invention, the assembly is mounted at a location with respect to the main frame.

In accordance with another embodiment of the toaster of the present invention, the toaster includes an electrical circuit for controlling the at least one electrical resistance member, and a support for the electrical circuit, and the assembly is mounted at a location with respect to the support.

In accordance with another embodiment of the toaster of the present invention, the assembly includes a plate carrying the armature, and the toaster includes an arm projecting from the plate, the arm including the lock, and the plate being pivotable about an axis, the at least one resilient contact member comprising at least one side branch extending from the plate. Preferably, the at least one resilient contact member comprises a pair of resilient contact members comprising a pair of the side branches.

In accordance with another embodiment of the toaster of the present invention, the toaster includes spring blade means mounted on the main frame in juxtaposition with the at least one resilient contact member for providing an electrical connection with the at least one electrical resistance member when engaged by the resilient contact member.

In accordance with another embodiment of the toaster of the present invention, the assembly includes a contact surface facing the electromagnet and the electromagnet includes a contact surface facing the assembly, and the assembly and the electromagnet are mounted at a location with respect to the main frame so that the contact surfaces of the assembly and the electromagnet are substantially horizontal.

In accordance with another embodiment of the toaster of the present invention, the assembly includes a contact surface and the electromagnet includes a contact surface facing the assembly, the assembly and the electromagnet being mounted at a location with respect to the main frame whereby the contact surfaces of the assembly and the electromagnet are substantially vertical.

In accordance with another embodiment of the toaster of the present invention, the assembly and the electromagnet comprise a single component mounted directly on the main frame.

In accordance with the present invention, these and other objects are thus achieved by means of an electric toaster comprising a main frame including:
  a toasting compartment associated with one or more electrical resistances;
  a bread-carrier carriage mounted to move in the toasting compartment between a high position for bread insertion, and a low position for toasting bread enabling the power circuit for the electrical resistance(s) to be closed, the carriage being held in this position by interaction with an electromagnet; and
  electrical safety means for interrupting the electrical power supply to the electrical resistance(s) at the end of the toasting cycle independently of the position of the bread-carrier carriage;
  the toaster being characterized in that the safety means are formed by a subassembly that is independent of the bread-carrier carriage and that comprises:
    a locking member suitable for locking the bread-carrier carriage in the low position;
    an armature suitable for interacting with the electromagnet; and
    at least one resilient contact member suitable for opening and closing the electrical circuit of the electrical resistances;
    the subassembly being mounted to move in or on the frame in such a manner as to be engaged by the bread-carrier carriage when it is substantially in its low position, the subassembly being movable between firstly an active position in which the locking member locks the bread-carrier carriage in its low, toasting position while interacting by means of its armature with the electromagnet and closing the electrical circuit of the resistance(s), and secondly an inactive position in which the locking member releases the bread-carrier carriage without interaction of the armature with the electromagnet while opening the electrical circuit of the electrical resistance(s).

BRIEF DESCRIPTION OF THE DRAWINGS

Other objects and advantages of the present invention are explained in greater detail in the following detailed description, with reference to the accompanying drawings that show the invention in illustrative and nonlimiting manner, and in which:

FIG. 6 is a front, perspective, fragmentary view of a second variant of the safety means of the present invention showing an electromagnet that is positioned horizontally; and FIG. 7 is a front, perspective, fragmentary view identical to that of FIG. 6 showing how the parts making up the safety means of the present invention are assembled together.

DETAILED DESCRIPTION

Figure 1:
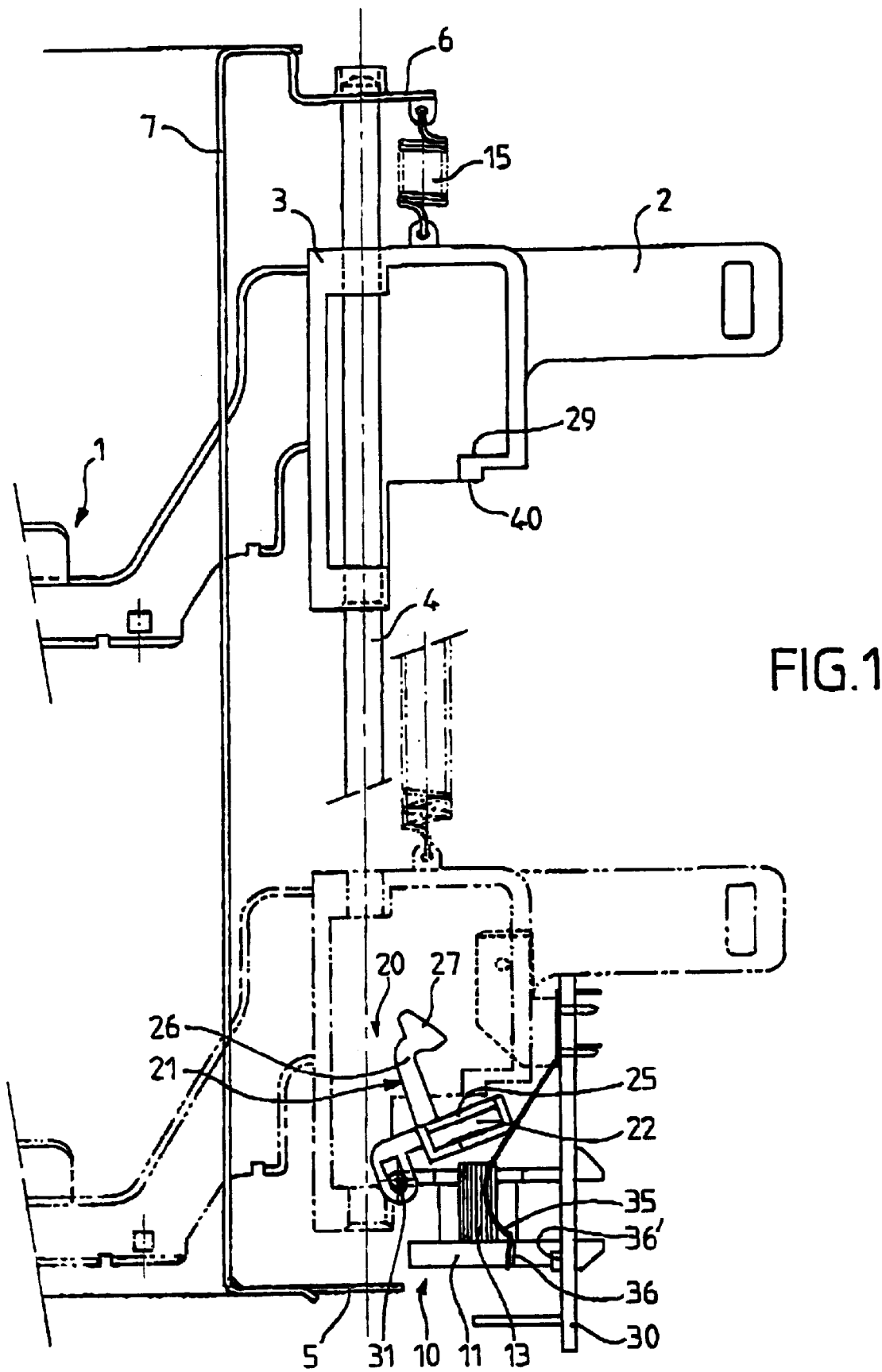
FIG. 1 is a side, elevational, fragmentary view of a toaster showing safety means in accordance with the present invention in the inactive position.

Turning to the drawings, FIGS. 1 to 7 are fragmentary views showing an electric toaster comprising a main frame on which the various component elements of the appliance are mounted (not shown in the figures) which, in a conventional manner, comprise a housing having a base and outside walls defining at least one toasting compartment provided at its top with one or more slots for receiving a bread-based food for toasting. Each toasting compartment is associated, in a conventional manner, with one or more electrical resistances, e.g. of quartz or other type, suitable for supplying the energy required for toasting the bread-based food. In an equally conventional manner, the electrical resistances are associated with electrical or electronic members for monitoring and controlling the toasting cycle, and also with manual control members for setting the toasting time, and appropriate electrical connection elements such as cables or wires, for example, enabling the various elements to be interconnected and also to be connected to the main electricity supply. Such structural elements are well known to one of ordinary skill in the art, so that the internal structure of the electric toaster of the present invention is not described in greater detail.

The electric toaster of the present invention comprises a main frame including a bread-carrier carriage 1 mounted to move in a toasting compartment under the control of a control lever 2 suitable for being actuated by the user of the toaster. The bread-carrier carriage 1 is mounted to move in translation by means of a carriage 3 that interconnects the bread-carrier carriage 1 and the control lever 2. The carriage 3 is guided in vertical translation on a guide column 4 that is interposed in the frame of the toaster between a bottom tab 5 and a top tab 6 secured to an upright 7 of the toaster. The toaster also has an electromagnet 10 mounted near the bottom of the frame and comprising an assembly body 11 having fixed thereon the coil 12 surrounding the core 13 of the electromagnet. In this configuration, the toaster carriage 1 is thus mounted to move in the toasting compartment between a low position for toasting bread, in which position the carriage acts by means of the carriage 3 and appropriate electrical contact means to close the power circuit for the electrical resistance(s), and is held in this position by interaction with the electromagnet 10, the carriage also being capable of occupying a high position for receiving bread.

The electric toaster of the present invention also has electrical safety means for interrupting the electrical power supply to the electrical resistance(s) at the end of the toasting cycle regardless of the position of the bread-carrier carriage 1, so as to ensure that even if the bread-carrier carriage 1 becomes wedged or jammed in its low, toasting position, the electrical power supply to the electrical resistance(s) is not maintained.

Figure 2:
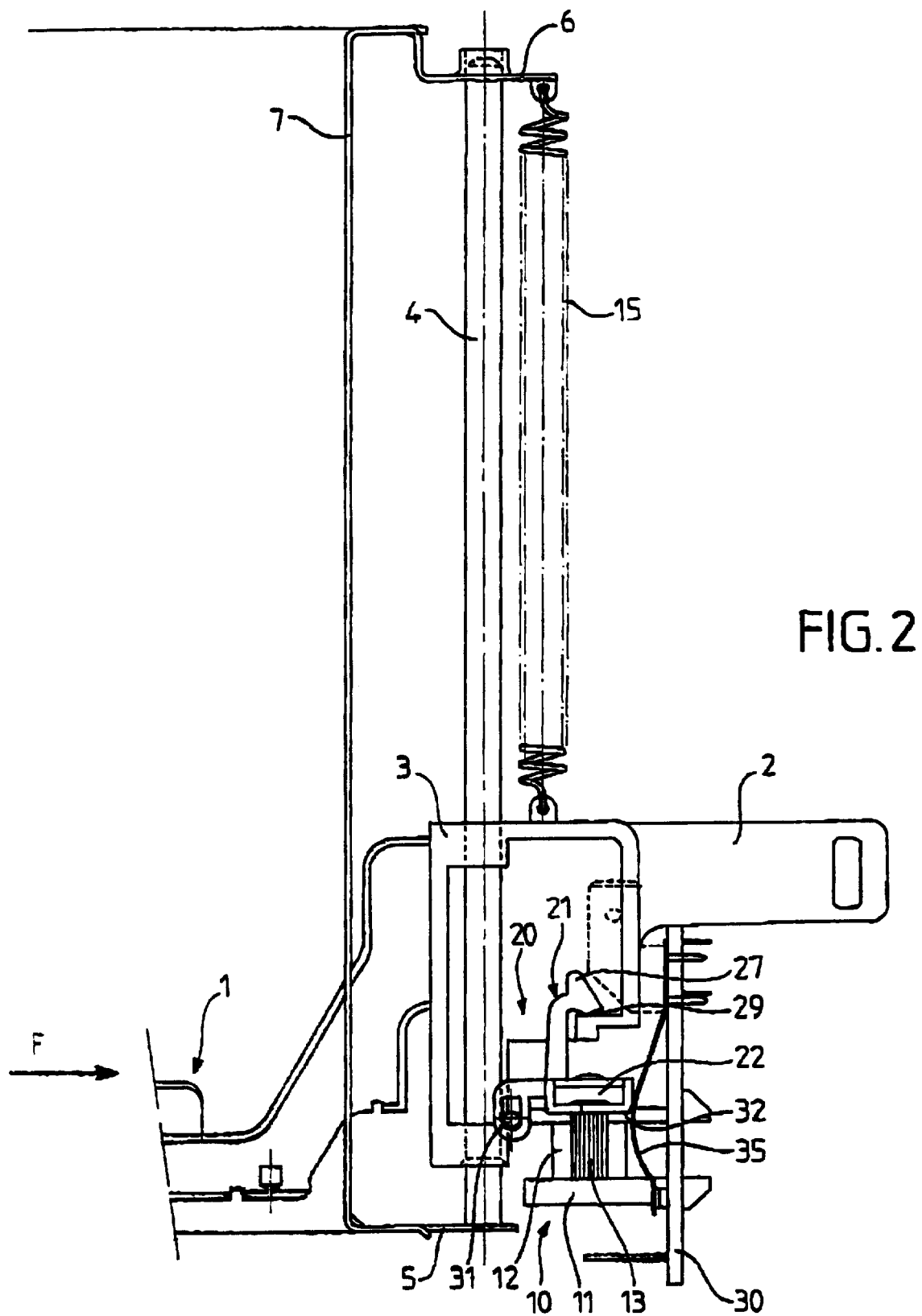
FIG. 2 is a side, elevational, fragmentary view of a toaster analogous to that shown in FIG. 1, with the active position of the safety means of the present invention serving to lock the bread-carrier carriage in the toasting position.

As can be seen in FIGS. 1 and 2, the bread-carrier carriage 1 is mounted with the possibility of resilient return to its high position by means of a return spring 15 interposed between the control carriage 3 and the top tab 6, for example.

In the present invention, the electric toaster has safety means which are formed by a subassembly 20 that is independent of the bread-carrier carriage 1 and that comprises:

a locking member 21 suitable for locking the bread-carrier carriage 1 in the low position;

an armature 22 suitable for interacting with the electromagnet 10; and at least one contact member 32 suitable for opening and closing the electrical circuit for the electrical resistance(s);

the subassembly being mounted in or on the frame in such a manner as to be engaged by the bread-carrier carriage 1 when it is substantially in its low position, the subassembly being movable between an active position in which the locking member 21 locks the bread-carrier carriage 1 in its low, toasting position, while interacting by means of its armature 22 with the electromagnet 10 and closing the electrical circuit of the electrical resistance(s), and an inactive position in which the locking member 21 releases the breadcarrier carriage 1 without interaction of the armature 22 with the electromagnet 10 while opening the electrical circuit of the electrical resistance(s).

In this embodiment, the subassembly 20 is thus a unit which is totally independent of the bread-carrier carriage 1 since it is neither carried by it nor linked to it, except when in the locking position. The subassembly 20 therefore does not follow movement of the bread-carrier carriage 1.

At the end of the timing cycle, because of the existence of the moving subassembly 20 and because of the way it is mounted, the electronic circuit of the toaster can interrupt the power supply to the electromagnet 10, thereby releasing the armature 22 whose contact member 32 opens the electrical circuit of the electrical resistances, even if the bread-carrier carriage 1 is jammed.

In a particularly advantageous version of the present invention, the subassembly 20 has a protective plate 25 suitable for covering the electromagnet 10 when the subassembly 20 is in its active position (FIG. 2). By means of this feature, it is possible to protect the contact area between the subassembly 20 and the electromagnet 10 from any external attack, and in particular from the interposition of crumbs or debris that could interact harmfully with the electrical connection and disconnection of the power supply to the electrical resistances. The overall safety of the appliance is thus improved.

In the present invention, the subassembly 20 can be mounted to move on the electromagnet 10, e.g. on the body 11 thereof. In one variant, it is possible to mount the subassembly 20 on other elements of the frame, e.g. directly on the support 30 of the integrated electronic circuit (FIGS. 4 and 5) that governs the entire toasting cycle.

Advantageously, the subassembly 20 is formed by the central plate 25 which supports the armature 22, and from which there projects at least one arm 26 whose end carries the active locking member, e.g. a hook 27. In the embodiment shown in FIGS. 1 to 3, the plate 25 is substantially plane and rectangular, with the arm 26 extending in a plane that is substantially perpendicular to the plane in which the plate 25 extends. The hook 27 is of appropriate shape complementary to a catch surface 29 formed on the control carriage 3 so as to provide effective locking of the bread-carrier carriage 1 without impeding subsequent unlocking thereof. The plate 25 is mounted to pivot relative to the electromagnet about a pin 31, e.g. by means of an assembly tab, and it has at least one side branch 32 which advantageously extends in the same plane as the plate 25 so as to form the electrical contact member of the subassembly 20.

Figure 3:
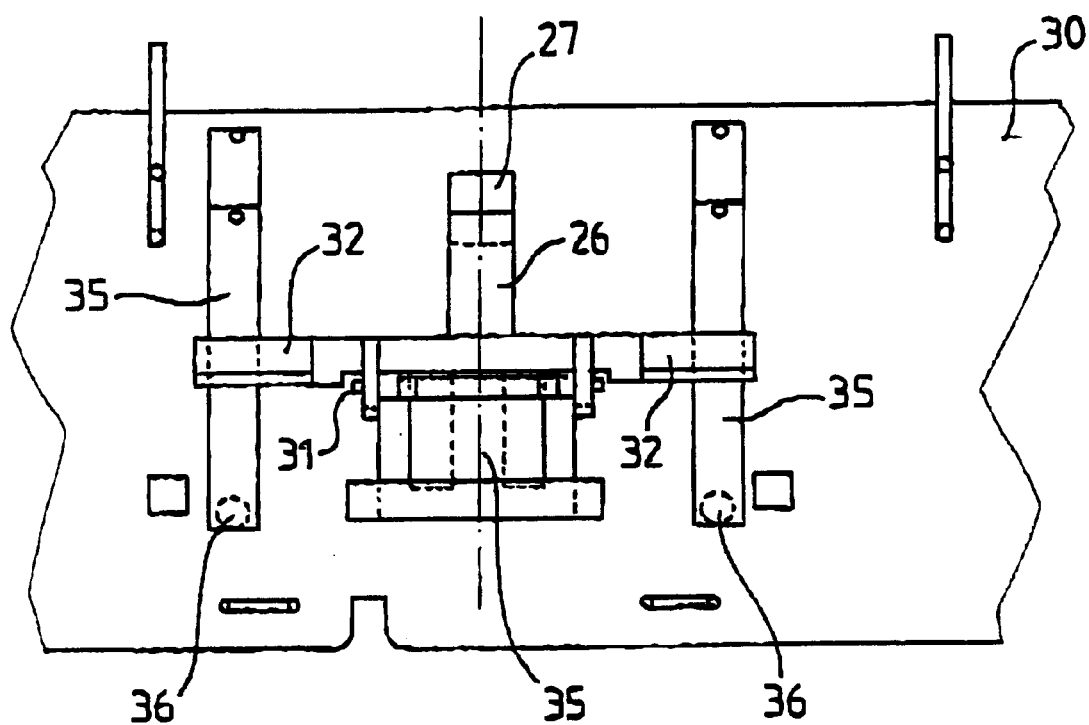
FIG. 3 is a front, elevational, fragmentary view seen along arrow F of FIG. 2, showing details of the safety means of the present invention.

In the embodiment shown in FIGS. 1 to 3, the subassembly 20 is mounted directly on the body 11 of the electromagnet 10 and relative thereto in and on the frame so that their respective contact surfaces are substantially horizontal when the toaster is in its normal position of use on a horizontal reference surface.

Advantageously, and as can be seen in FIG. 3, the subassembly 20 has two opposite side branches 32 situated on either side of the central plate 20 so as to form two contact members of the subassembly 20 when the toaster requires two pole electrical connections to keep live and neutral separate. The toaster of the present invention also has metal spring blades 35 mounted in or on the frame in register with the contact members 32, i.e. in register with the branches 32. The spring blades 35 are advantageously mounted on the support 30 of the printed circuit and carry contacts 36 at their ends for making electrical connection with matching contacts 36' so as to provide appropriate electrical connection to the electrical resistance(s) when the spring blades 35 are engaged by the contact member 32 as a result of the moving subassembly 20 being displaced. Advantageously, the spring blades 35 are curved so as to provide an additional release force assisting the subassembly 20 in returning to its inactive position (FIG. 1) when the power supply to the electromagnet 10 is cut.

Advantageously, the subassembly 20 and the electromagnet 10 are made of insulating plastic material having good mechanical properties, e.g. of the polyamide 66 type filled to 30% with glass fibers or the equivalent. The spring blades are advantageously made of phosphor bronze (CuSn8½), and the armature is advantageously made of zinc bichromate steel. The contacts, 36 and 36', could advantageously be made of copper covered with a layer of silver (AgNi) having a thickness of about 10 microns. In a variant, the electrical contacts, 36 and 36', could alternatively be formed by a drop of silver deposited directly on the spring blades 35.

The subassembly 20 operates as follows:

When the user actuates the control lever 2 to move the bread-carrier carriage 1 down to its low, toasting position (FIG. 2), the control carriage 3 moves vertically down along the guide column 4. In the vicinity of the bottom abutment position of the bread-carrier carriage 1, a bearing rib 40 of the control carriage 3 engages a corresponding bearing surface on the subassembly 20 which then tilts about its pivot axis 31 so as to go from its inactive position as shown in FIG. 1 to its active position as shown in FIG. 2. As it tilts, the branches 32 engage and press against the spring blades 35, thereby closing the power supply circuit for the electrical resistances of the toaster. Simultaneously, during said tilting, the hook 27 engages the catch surface 29 of the control carriage 3 so as to lock the carriage 3, and consequently lock the bread-carrier carriage 1 in its low, toasting position as shown in FIG. 2.

In this locking position, the electromagnet 10 is then powered and holds the armature 22 in place, which has the effect of holding the subassembly 20 in its position for mechanically locking the bread carrier and for powering the electrical resistances. The toasting cycle can then begin in application of the cycle previously selected by the user.

The device is implemented overall so that when the user ceases to press down the control lever 2, the bread-carrier carriage 1 rises under drive from the spring 15 through a stroke of a few millimeters until the surface 29 comes into contact with the hook 27 so as to put the subassembly 20 into a position that makes it possible for it to subsequently tilt freely from its locking position to its unlocking position.

At the end of the toasting cycle, the electronic timing system automatically interrupts the power supply to the electromagnet 10, thereby releasing the armature 22 from its position in contact with the coil 13. The subassembly 20 is then free to tilt into its inactive position about the pivot axis 31 under drive from the ejection force supplied by the spring blades 35. Thus, the spring blades 35 return to their natural, rest position (as shown in FIG. 1), thereby creating sufficient space between the contacts, 36 and 36', to ensure that the power circuit is interrupted. In this situation, even if the bread-carrier carriage 1 is blocked for any reason, the power supply is interrupted. In a normal toasting cycle, the bread-carrier carriage 1 is released and rises to its rest position as shown in FIG. 1 under traction from the spring 15.

Figure 4:
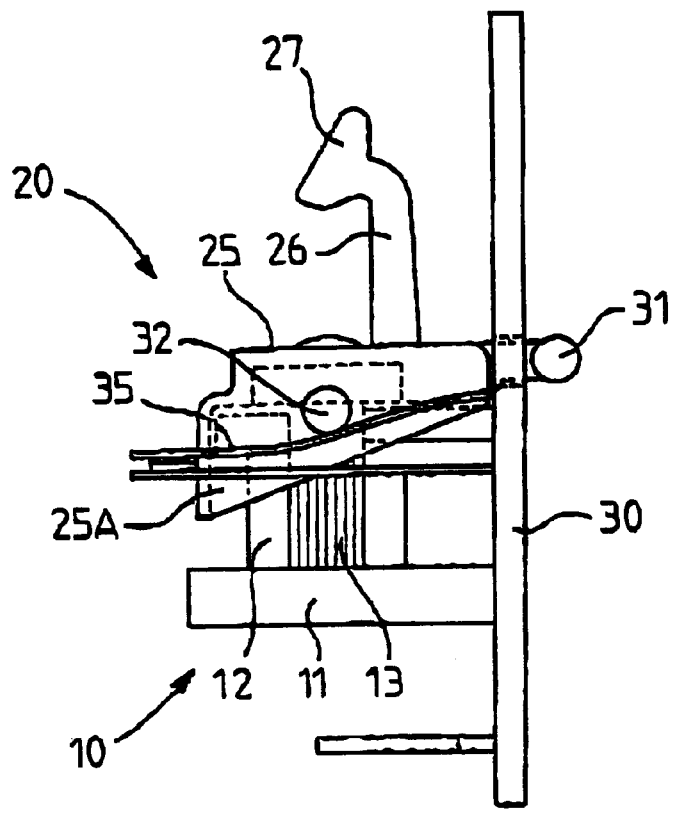
FIG. 4 is a side, elevational, fragmentary view of a toaster showing a variant of the safety means of the present invention in the active position.
Figure 5:
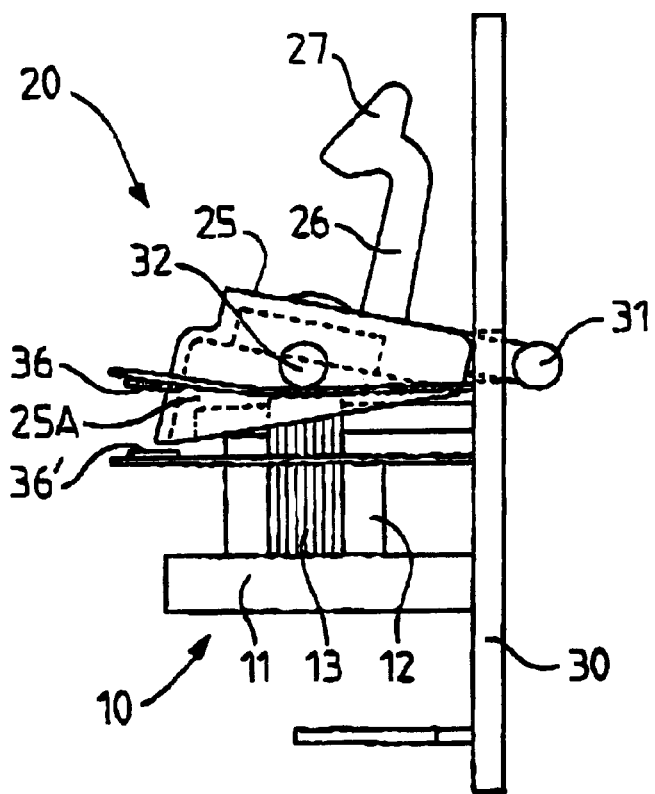
FIG. 5 is a side, elevational, fragmentary view of a toaster analogous to that of FIG. 4, showing a variant of the safety means of the present invention in the inactive, unlocking position.

FIGS. 4 and 5 show an embodiment which differs from the embodiment described above only by being arranged somewhat differently. Thus, the protective plate 25 is provided with a surrounding side skirt 25A to surround the horizontal engagement surface of the electromagnet 10 substantially completely, covering all sides thereof, at least near the top portion of the coil 12 and the core 13. Because of this feature, the magnetic contact zone is better protected and the deposit of any foreign body, and in particular bread crumbs, is prevented.

In this embodiment, the moving subassembly 20 is pivoted directly on the support 30 of the electronic circuit, the pivot pin 31 being stationary in this case and held in a hole in the support 30. As can be seen in FIGS. 4 and 5, the spring blades 35 connected to the electronic circuit extend substantially perpendicularly to the plane of the support 30 so as to be engaged frontally by the side branches 32. In addition, the side branches 32 are disposed in such a way as to be substantially centered relative to the core 13 of the electromagnet 10 so as to provide good centering for the mechanical forces on the electromagnet 10, thus enhancing the quality of the electrical connection and the general mechanical behavior of the assembly.

FIGS. 6 and 7 show another embodiment which differs from the preceding embodiments solely in having a different physical configuration.

In this embodiment, the contact surface between the armature 22 and the core 13 of the electromagnet 10 is substantially vertical when the toaster is in its normal utilization position in which the housing extends substantially vertically. Because of this configuration, a deposit of foreign bodies, and in particular bread crumbs, on the electrical contact surface is substantially avoided, thereby contributing to increasing the operating safety of the toaster. In this embodiment, the main axis of the coil 13 thus extends substantially horizontally in the frame of the toaster.

In the embodiment shown in FIGS. 6 and 7, the subassembly 20 and the electromagnet 10 form a single component which is advantageously made of plastics material, suitable for being mounted directly on the frame of the toaster 1, e.g. by means of plastic clips 50. In this embodiment, the subassembly 20 is pivoted about its axis 31 to the body of the electromagnet 10, e.g. in corresponding setbacks 31'. Naturally, instead of being mounted directly on the frame of the toaster, such a single component forming a one-piece unit can be mounted directly on the support 30 of the electronic circuit of the toaster so as to reduce the number of connectors.

In this embodiment, the side branches 32 have sloping ramps 32A for coming into contact with corresponding ramps 35A formed on the spring blades 35 to ensure that they move when the subassembly 20 pivots. In the embodiments shown, the spring blades 35 are in the form of blades that are raised, e.g. being inserted in recesses in the plastics body of the electromagnet 10 or by being overmolded therein, and they have respective current feed tabs 35B at their bottom ends. The slopes of the ramps 32A and of the corresponding ramps 35A are designed in such a manner as to exert sufficient force on the electrical contacts during closure while retaining the ability to push back the subassembly 20 elastically towards its inactive position when the power supply to the coil 13 is cut.

In this embodiment, the position of the hook 27 relative to the axis of rotation 31 and the horizontal axis of the coil 12 are coordinated in such a manner as to reduce the force required from the electromagnet 10 in order to hold the bread-carrier carriage 1 in the toasting position by a lever effect.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A toaster comprising a main frame including a toasting compartment including at least one electrical resistance member, a carriage mounted for reciprocation within said toasting compartment between an upper position and a lower position, whereby a product to be toasted can be loaded therein when said carriage is in said upper position and said product can be toasted when said carriage is in said lower position, an electromagnet disposed adjacent to said carriage when said carriage is in said lower position for holding said carriage in said lower position, safety means for interrupting the supply of electricity to said at least one electrical resistance member at the end of a predetermined toasting cycle independent of said position of said carriage, said safety means comprising an assembly independent of said carriage, said assembly movable between an active position and an inactive position, and comprising a lock for locking said carriage in said lower position when said assembly is in said active position and for releasing said carriage from said lower position when said assembly is in said active position, an armature for carrying said lock, said armature mounted adjacent to said electromagnet for engagement with said electromagnet when said assembly is in said active position and for disengagement from said electromagnet when said assembly is in said inactive position, and at least one resilient contact member for establishing electrical contact with said at least one electrical resistance member when said assembly is in said active position and for eliminating said electrical contact with said at least one electrical resistance member when said assembly is in said inactive position.

2. The toaster of claim 1 wherein said assembly includes a protective plate for covering said electromagnet when said assembly is in said active position.

3. The toaster of claim 1 wherein said assembly is mounted at a location with respect to said electromagnet.

4. The toaster of claim 1 wherein said assembly is mounted at a location with respect to said main frame.

5. The toaster of claim 1 including an electrical circuit for controlling said at least one electrical resistance member, and a support for said electrical circuit, and wherein said assembly is mounted at a location with respect to said support.

6. The toaster of claim 1 wherein said assembly includes a plate carrying said armature, and including an arm projecting from said plate, said arm including said lock, and said plate being pivotable about an axis, said at least one resilient contact member comprising at least one side branch extending from said plate.

7. The toaster of claim 6 wherein said at least one resilient contact member comprises a pair of resilient contact members comprising a pair of said side branches.

8. The toaster of claim 1 including spring blade means mounted on said main frame in juxtaposition with said at least one resilient contact member for providing an electrical connection with said at least one electrical resistance member when engaged by said resilient contact member.

9. The toaster of claim 1 wherein said assembly includes a contact surface facing said electromagnet and said electromagnet includes a contact surface facing said assembly, and said assembly and said electromagnet are mounted at a location with respect to said main frame so that said contact surfaces of said assembly and said electromagnet are substantially horizontal.

10. The toaster of claim 1 wherein said assembly includes a contact surface and said electromagnet includes a contact surface facing said assembly, said assembly and said electromagnet being mounted at a location with respect to said main frame whereby said contact surfaces of said assembly and said electromagnet are substantially vertical.

11. The toaster of claim 1 wherein said assembly and said electromagnet comprise a single component mounted directly on said main frame.

* * * * *